Aug. 22, 1933.  G. C. BINGHAM  1,923,415
MACHINE FOR PLUCKING AND STUBBING BIRDS
Filed Sept. 22, 1931  4 Sheets-Sheet 1
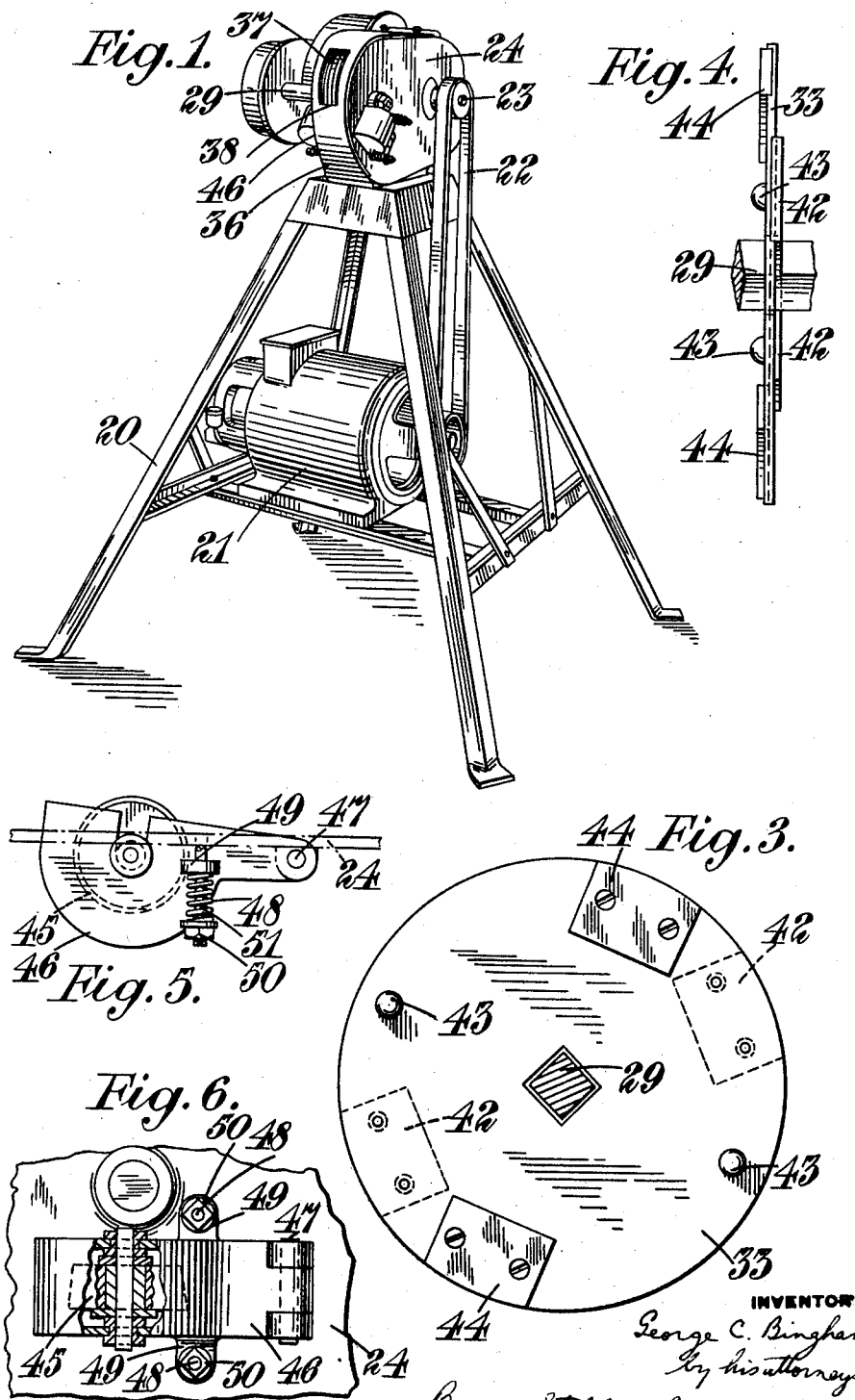

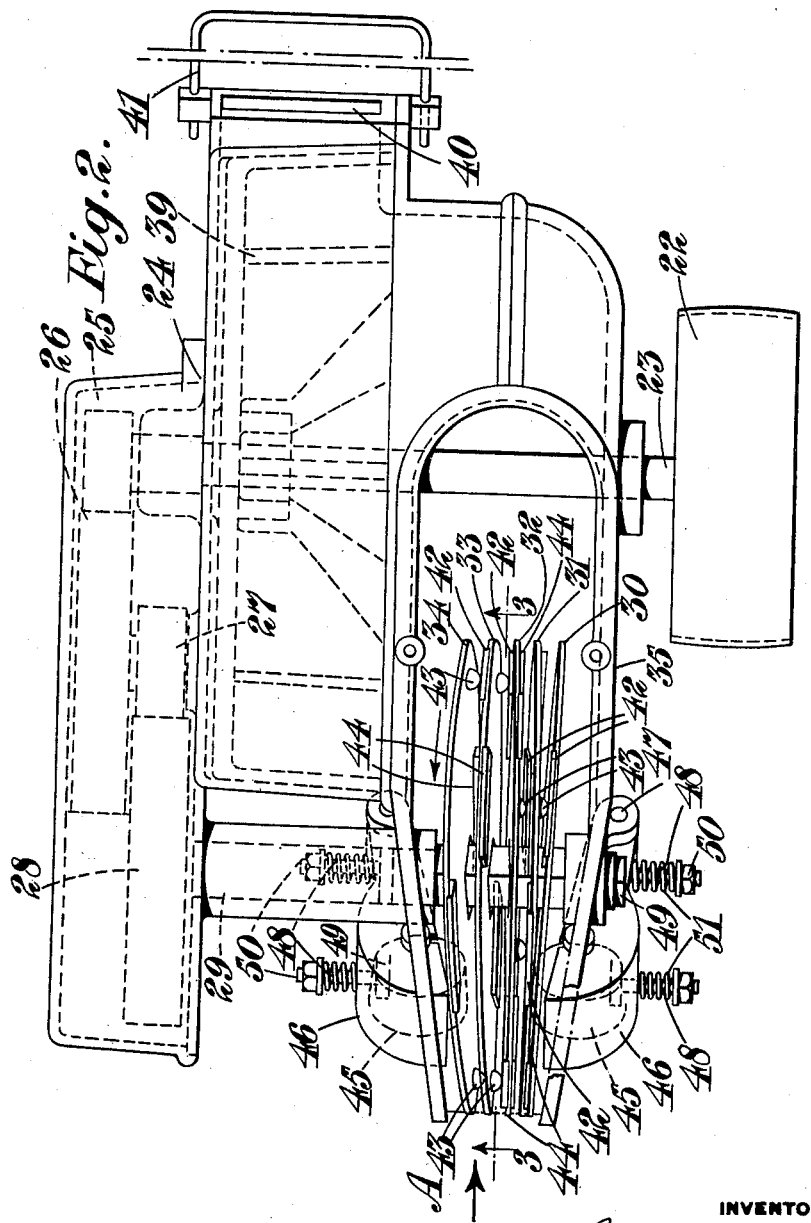

Aug. 22, 1933. G. C. BINGHAM 1,923,415
MACHINE FOR PLUCKING AND STUBBING BIRDS
Filed Sept. 22, 1931 4 Sheets-Sheet 3
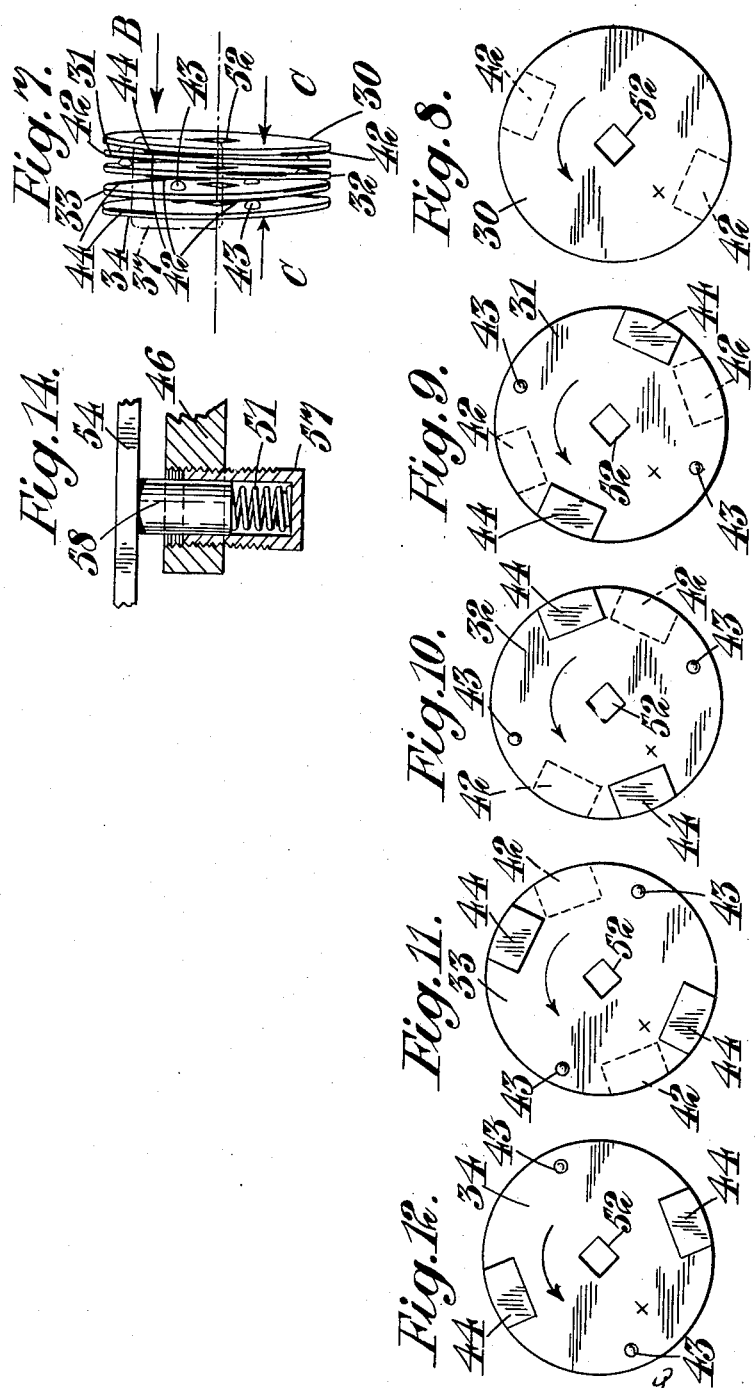
INVENTOR
George C. Bingham
by his attorneys
Byrnes, Stebbins, Parmelee & Blenko Aug. 22, 1933.　　　　G. C. BINGHAM　　　　1,923,415
MACHINE FOR PLUCKING AND STUBBING BIRDS
Filed Sept. 22, 1931　　　4 Sheets-Sheet 4
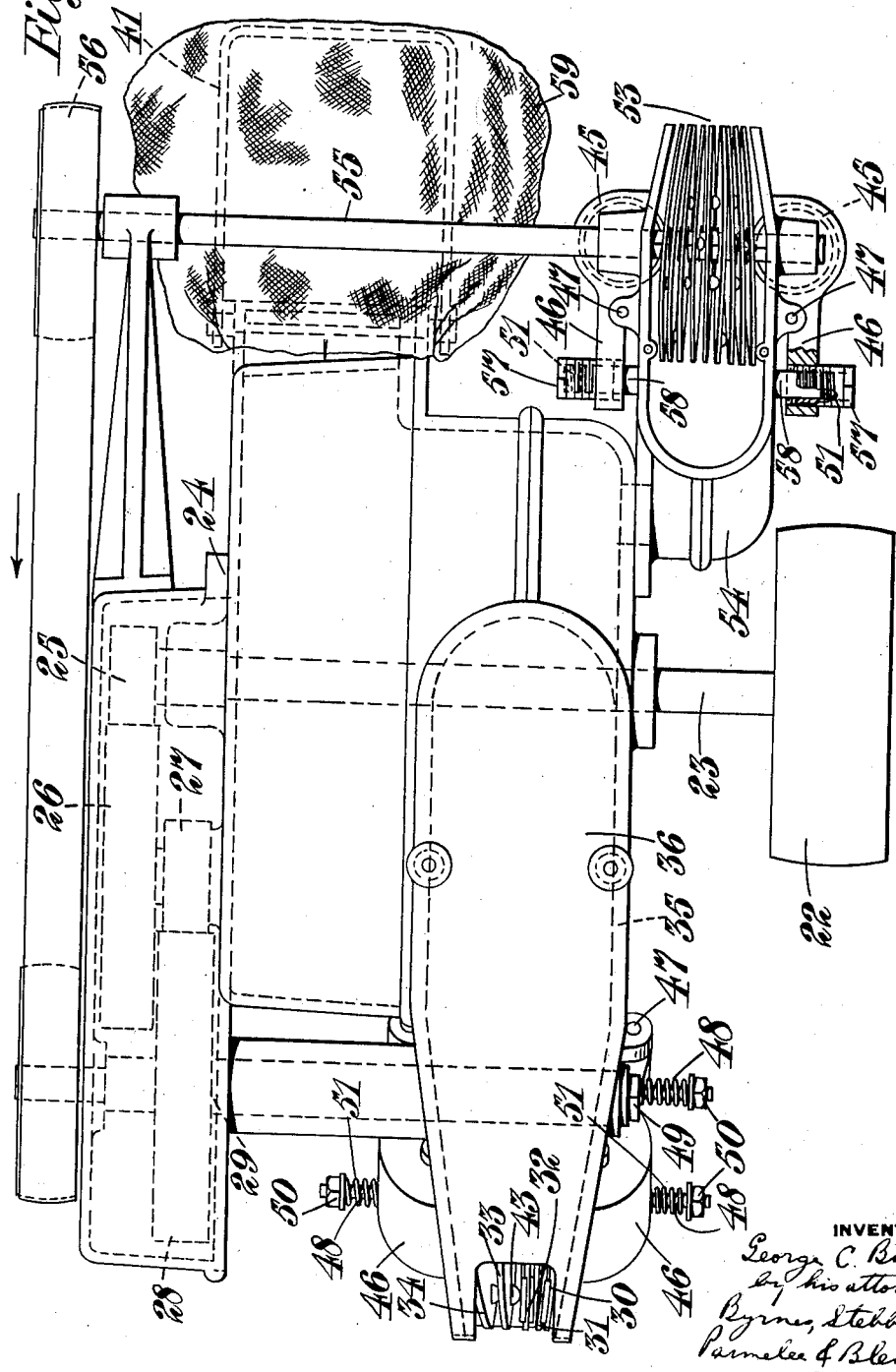
INVENTOR
George C. Bingham
by his attorneys
Byrnes, Stebbins,
Parmelee & Blenko Patented Aug. 22, 1933

1,923,415

UNITED STATES PATENT OFFICE 1,923,415

MACHINE FOR PLUCKING AND STUBBING BIRDS

George Cowley Bingham, Maldon, England

Application September 22, 1931, Serial No. 564,328, and in Great Britain December 11, 1930

6 Claims. (Cl. 17—11)

This invention is for an improved machine for plucking and stubbing birds, and is concerned with machines of the type comprising a plurality of coaxially arranged rotatable discs one or more of which are arranged to be deflected or bent one or more times during each revolution so as to cause the margins of adjacent discs to approach one another to grip between them at a predetermined location feathers, down or stubs on the carcases of birds presented to the edges of the discs at the said location and then, after a predetermined arcuate movement of rotation in such gripping position, to recede to release the feathers, down or stubs which by this means are extracted from the birds. For brevity, the term "feathers" will be used hereinafter to designate "feathers, down or stubs".

A machine of the aforesaid type is described in the specification of my pending application for Letters Patent, Serial No. 326,216, now Patent No. 1,875,980, dated Sept. 6, 1932 and one object of the present invention is to improve the construction and arrangement of the discs aforesaid. In the said prior specification, the term "discs" is employed to include plucking members in the form of rigid of flexible plates, or of a flexible member of spiral formation, each convolution of which is the equivalent of a disc, or plucking members otherwise constituted but adapted to be deflected or bent to cause their margins to approach and to recede in the manner and for the purpose described above, and herein the term "discs" is similarly employed.

According to one feature of the present invention, in a machine of the type set forth for plucking and stubbing birds the deflection of the discs is effected by interposing between the adjacent faces of the discs projections located on opposite sides of the axis of rotation of the discs, and providing guide-members between which the discs rotate. These guide-members are arranged at such a distance apart and are so disposed relatively to the discs as to engage the latter as they rotate so as to cause adjacent discs to tilt relatively to each other, in the required direction to grip the feathers, about a line passing through the said projections.

Preferably several pairs of discs are provided in each machine which are assembled with the projections thereon in different angular positions when viewed endwise of the axis of rotation of the discs so that the pairs of discs act successively to grip and to remove the feathers.

The guide-members aforesaid are preferably rollers, one at least of which is pressed towards the disc by a spring or an equivalent device.

If desired, one or more of the discs may be provided with gripping pads of friction material located on the margins of the discs, for instance approximately 90° from the aforesaid projections. These pads may be made of rubber, leather or other suitable material.

It is also within the invention to provide a machine of the type set forth having two sets of discs whereof one set is intended for plucking and the other set for stubbing purposes. In practice it has been found that the best results are obtained when the stubbing discs rotate so that their edges move upwardly at the gripping location. This enables the stubs to be scraped on the plucking bar, or the equivalent, which is usually provided in machines of the aforesaid type adjacent to the edges of the discs at the gripping position, so as to cause the stubs to project from the skin and become gripped by the discs. For this reason, the two sets of discs are preferably so arranged and are so driven that the edges of the plucking discs move downwardly at the gripping position and the edges of the set of stubbing discs move upwardly at the gripping position.

One embodiment of the invention will now be described, by way of example, with reference to the accompanying drawings, in which:—

Figure 1 is a perspective view of the machine;

Figure 2 is a plan of the head thereof, drawn to a larger scale than Figure 1, and with the cover-plate of the housing enclosing the discs removed;

Figure 3 is a secton on the line 3—3 of Figure 2 showing one of the discs;

Figure 4 is an end view thereof;

Figure 5 is a plan of the mounting for one of the rollers;

Figure 6 is a sectional elevation thereof, partly in section;

Figure 7 is a diagrammatic view of the assembled discs, looking in the direction of the arrow A in Figure 2;

Figures 8 to 12 inclusive, are elevations of the separate discs shown in Figure 7 when viewed in the direction of the arrow B of Figure 7, Figure 13 is a plan of the head of a machine having two sets of discs, and Figure 14 is a detail view drawn to a larger scale than Figure 13 showing the spring mounting for the rollers in the construction shown in Figure 13.

Like reference numerals indicate like parts throughout the drawings.

The machine shown in Figures 1–12 inclusive comprises a frame 20 on which an electric motor 21 is supported. The motor is arranged to drive by a belt 22, a shaft 23 which is journalled in bearings in a casing 24 mounted on the frame 20. The shaft 23 is arranged to drive through a train of gear-wheels 25, 26, 27 and 28 a spindle 29 on which a set of five discs, indicated by the reference numerals 30 to 34, inclusive, are mounted so as to rotate therewith. The discs are located in an extension 35 of the casing 24 which is closed by a cover-plate 36, see Figure 1, provided with an opening 37 adjacent to the edges of the discs. The lower edge 38 of this opening constitutes a plucking bar against which the bird being plucked is held as the feathers thereof are gripped and extracted by the discs.

Mounted on the shaft 23 within the casing 24 is a fan 39 which is arranged to draw the feathers as they are released by the discs and eject them through an outlet 40 into a bag (shown at 59 in Figure 13) which may be secured and held open by a frame 41 mounted on the casing 24 adjacent to said outlet.

The portion of the spindle 29 on which the discs 30 to 34 are mounted is of square cross-section and similarly shaped holes 52 are provided in the discs, but these holes are slightly larger than the spindle to permit the discs to tilt towards one another to grip the feathers while at the same time ensuring that the discs will be driven by the spindle. The disc 30 has a plain outer face and on its inner face two hardened steel wearing pads 42 disposed 180° apart. The opposed face of the adjacent disc 31 has on it two projections in the form of knobs 43 disposed 180° apart and two gripping pads 44 of rubber or leather or other friction material which are arranged on the margin of the disc midway between the projection 43. The other face of the disc 31 is provided with two hardened steel pads 42. The discs 32 and 33 are of similar construction to the disc 31. The disc 34 has on that face which is opposed to the disc 33 two projections 43 and two gripping pads 44, but the outer face of said disc is plain. The discs are assembled on the spindle 29 in such a way that the projections 43 on the various discs are in different angular positions when viewed endwise of the said spindle, and the hardened steel pads 42 are disposed on the discs in such a position that they will be engaged by the projections 43 on adjacent discs.

The discs rotate between guide-members in the form of rollers 45 one on each side of the set of discs. These rollers are so disposed relatively to the discs as to exert pressure on them along a line indicated by the arrows C in Figure 7 and at a point on the discs indicated by the cross in Figures 8 to 12, inclusive. Further, the rollers are arranged at such a distance apart that adjacent discs will be caused thereby to tilt relatively to each other about a line passing through the projections 43. Thus, the discs as they rotate act successively to grip and remove the feathers.

Each of the rollers 45 is removably mounted in a housing 46 which is pivoted at 47 to the extension 35 of the casing 24, see especially Figures 5 and 6, and openings are provided in the side walls of said extension to accommodate the said housings. Projecting outwardly from each of said side walls is a spindle 48 which extends through a lug 49 on the housing 46. Surrounding the spindle 48 between the said lug and a washer and nut 50 on the outer end of the spindle 48 is a compression spring 51. By adjusting said nuts the pressure exerted by the rollers 45 against the discs can be adjusted.

The discs 30—34 are rotated in the direction indicated by the arrows in Figures 8–12, i. e. so that their edges move downwardly at the gripping position, and from the foregoing description it will be appreciated that if the bird to be plucked is held against the opening 37 with the feathers projecting over the lower edge of that opening into the spaces between the discs, the said feathers will be gripped by the discs as they rotate and pulled out from the bird over said edge. When the discs recede from one another the feathers will be released and drawn into the casing 24 by the fan 39 whence they will be delivered by the outlet 40 into the bag supported by the frame 41.

In the modification shown in Figure 13, the set of discs 30—34 is intended to be used for plucking purposes and a second set of discs indicated generally by the reference numeral 53 is provided for stubbing purposes. The set of discs 53 is arranged in a casing 54 located on the opposite side of the shaft to that on which the other set of discs is situated and attached to the casing 24. The stubbing discs 53 are of smaller diameter than the plucking discs 30—34 but they are constructed and operated for gripping purposes similarly to the plucking discs and for this purpose are mounted on a spindle 55 which is driven from the spindle 29 by a belt 56. In the construction shown in Figures 13 and 14, the spring 51 is contained in a cup-shaped container 57 which is screwed into the housing 46. The spring is located between the bottom of the container and a stud 58 which projects from the casing 54 so that the pressure exerted by the rollers can be varied by adjusting the container in the housing 46. Spring-controlled rollers 45 are provided as in the construction previously described to control the discs 53. The two sets of discs are rotated in the same direction, namely anti-clockwise when looking towards the side of the machine on which the belt 22 is arranged. Therefore, the edges of the discs 30—34 move downwardly at the gripping position and the edges of the set of discs 53 move upwardly at the gripping position.

The invention is not restricted to the constructions described. For instance, the pads on the discs are not essential but it is preferred to employ them and especially the pads 42 at least on the plucking discs, and the discs need not be circular. They may be sector shaped or of any other shape which will provide the gripping points and the projections about which the discs are tilted. Further, the discs may be mounted on gymbals or in any other way which will permit them to tilt. Machines according to the invention may be provided with a head having a single set of discs which are rotated so that the edges thereof move either downwardly or upwardly at the gripping position, or with a head having two sets of discs whereof the edges of one set move in the opposite direction to those of the other set at the gripping location, or with a head having a single set of discs the direction of rotation of which can be reversed. In the latter case either two sets of rollers for tilting the discs are provided, one set operating while the other set is inoperative, or a single set of rollers is employed with means for shifting their positions relative to the discs.

I claim:

1. In a machine for plucking and stubbing birds, the combination of at least one pair of spaced coaxially arranged tiltable discs, means for rotating said discs, two pivotal projections upon that face of one disc of each pair which is directed towards the other disc of that pair, which projections are diametrically arranged one on each side of the axis of rotation of the discs, and means operating in a fixed position upon the discs during rotation thereof to constrain them to tilt towards one another.

2. In a machine for plucking and stubbing birds, the combination of a plurality of spaced coaxially arranged tiltable discs, means for rotating said discs, two pivotal projections upon that face of one of each pair of discs which faces the other disc of that pair, which projections are diametrically arranged one on each side of the axis of rotation of the disc, and opposed spring-loaded rollers operating upon the outer faces of the end discs and constraining the discs to tilt towards one another.

3. A machine for plucking and stubbing birds comprising at least one set of a plurality of pairs of spaced coaxially arranged tiltable discs, means for rotating said discs, a set of two pivotal projections upon that face of one of each pair of discs which is directed towards the other disc of that pair, which pivotal projections are diametrically arranged one on each side of the axis of rotation of the discs, which discs are so assembled that the sets of pivots lie in different angular positions when viewed endwise of the discs, and pressure-applying devices operating in a fixed position upon the outer faces of the end discs and constraining them to tilt towards one another.

4. In a machine for plucking and stubbing birds, the combination of at least one pair of spaced coaxially arranged tiltable discs, means for rotating said discs, two pivotal projections upon that face of one disc which is directed towards the other disc of that pair, which pivotal projections are arranged one on each side of the axis of rotation of the discs, wearing pads of hard metal on said other disc arranged thereon so as to be engaged by the pivotal projections on the first-mentioned disc, and means constraining the margins of adjacent discs during rotation thereof towards one another.

5. A machine for plucking and stubbing birds, comprising at least one set of plurality of pairs of spaced co-axially arranged tiltable discs, means for rotating said discs, a set of at least two pivotal projections upon that face of one disc of each pair which is directed towards the other disc of that pair, which pivotal projections are arranged in a line with at least one on each side of the disc and are so disposed that the sets of pivots lie in different angular positions when viewed endwise of said axis, and means for constraining the discs during rotation to tilt towards one another.

6. A machine for plucking and stubbing birds comprising at least one set of a plurality of pairs of spaced co-axially arranged tiltable discs, means for rotating said discs, a set of two pivotal projections upon that face of one disc of each pair which is directed towards the other disc of that pair and one on each side of the axis of the disc, which pivotal projections are so disposed that the sets of pivots lie in different angular positions when viewed endwise of said axis, and spring-loaded rollers operating upon the outer face of the end discs during rotation to cause the discs to tilt towards one another.

GEORGE COWLEY BINGHAM.